No. 665,029. Patented Jan. 1, 1901.
P. J. McATEE.
BUG TRAP.
(Application filed Oct. 10, 1900.)
(No Model.)
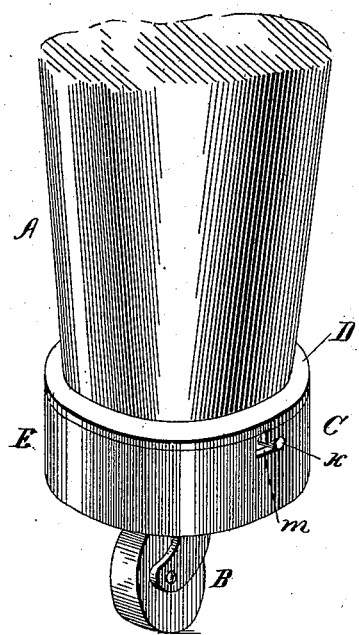
Fig. 1.
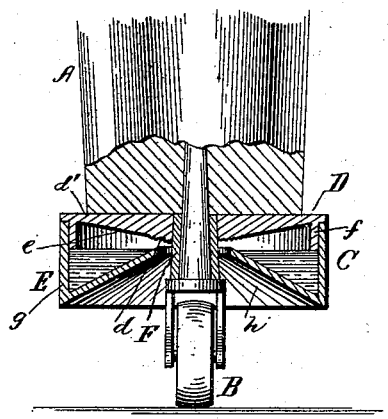
Fig. 2.
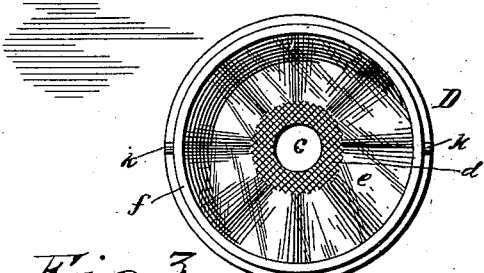
Fig. 3.
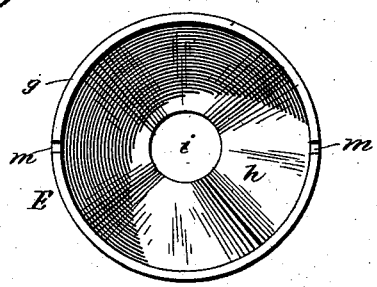
Witnesses:
Inventor
Patrick J. McAtee
per _____ Attorney
THE NORRIS PETERS CO., PHOTO-LITHO., WASHINGTON, D. C.

UNITED STATES PATENT OFFICE.

PATRICK J. McATEE, OF GILBERTON, PENNSYLVANIA.

BUG-TRAP.

SPECIFICATION forming part of Letters Patent No. 665,029, dated January 1, 1901.

Application filed October 10, 1900. Serial No. 32,615. (No model.)

*To all whom it may concern:*

Be it known that I, PATRICK J. McATEE, a citizen of the United States, residing at Gilberton, in the county of Schuylkill and State of Pennsylvania, have invented certain new and useful Improvements in Bug-Traps; and I do hereby declare the following to be a full, clear, and exact description of the invention, such as will enable others skilled in the art to which it appertains to make and use the same.

My invention relates to insect-guards, and has for one object to provide a guard or trap for insects which is adapted to be attached to the legs of bedsteads, tables, or the like.

With this object in view I have provided an insect guard or trap which is simple in its construction, cheap to manufacture, and composed of a minimum number of parts.

A further object of my invention is to provide a trap which is practically dust-proof, the contents of which are not accessible to children playing on the floor.

The points of novelty of my invention will be hereinafter fully explained, and more specifically pointed out in the appended claims.

Referring to the accompanying drawings, Figure 1 shows my trap attached to a bedstead-leg. Fig. 2 is a sectional view of the same. Fig. 3 is a plan view of the interior surfaces of the upper and lower members.

Like letters of reference indicate the same parts throughout the several figures, in which—

A is the bedstead-leg, B the caster, and C the trap. Said trap C is composed of an upper member D and a lower member E. Said upper member D has its top $d'$ substantially flat, the inner surface of which is convex, as shown in Fig. 2, and is provided with a central circular opening $c$. Directly surrounding said opening $c$, the inner surface of the upper member D is roughened, as shown at $d$, the other surrounding surface $e$ being smooth and polished, as shown in Fig. 3. Near the periphery of the upper member D and at a distance equal to the section of the wall of the lower member E is a downwardly-projecting rim or flange $f$, extending into the lower member E. Said lower member E is composed of a circular wall $g$ and a conical-shaped bottom $h$, said bottom having its inner surface smooth and polished and provided with a circular opening $i$ considerably larger than the opening $c$ in the upper member D. The flange or rim $f$, which fits into the lower member E, is provided with two radially-projecting pins $k$, and the circular wall $g$ of the lower member is provided with two corresponding L-shaped notches $m$, for the purpose of securing the two sections together. I do not limit myself to this manner of fastening, as male and female threads may be employed, or in place of the pins $k$ I might punch or corrugate the flange or rim, which would answer the same purpose as the pins, but would be simpler and cheaper to manufacture.

I employ a sleeve F, which fits within the opening $c$ in the top $d'$, through which sleeve the caster B is inserted, thus relieving the trap of the strain, although the use of said sleeve is not at all essential.

Having thus described the several parts of my invention, its operation is as follows: The lower member E is filled with turpentine or similar liquid and secured to the upper member D. The caster is then inserted into the sleeve F. The trap C is then slipped over the top of the caster, which caster is then inserted into the bedstead or table leg in the ordinary manner. I will now explain the manner of catching the insects: A bug in order to reach the leg of any furniture provided with my trap must first climb up the caster B, and thence to the sleeve F. Said sleeve fitting snugly into the top $d'$ of the upper member D, the bug is compelled to take to the roughened surface $d$ of the top $d'$. To this the bug can readily adhere, and it can walk over as much of the convex surface as is made rough, which rough surface extends to a point beyond the circumference of the opening $i$ in the conical bottom $h$. The bug, therefore, is beyond said opening before it reaches the smooth and polished surface $e$. Over said surface the bug is unable to walk, and it drops into the liquid directly underneath. As aforesaid, the inner surface of the conical bottom is smooth and polished, which prevents the bug from climbing up should he in any manner escape falling directly into the liquid.

Having thus described the operation of my invention, I do not wish to be understood as limiting myself to the exact construction herein set forth, as various slight changes might be made therein which would fall within the limit and scope of my invention, and I consider myself entitled to all such changes.

What I claim as new, and desire to secure by Letters Patent of the United States, is—

1. In a bug-trap, the combination of an upper member, a lower member having a central opening therein, a central roughened surface on the upper member extending to a point beyond the central opening of the lower member, and a surrounding smooth surface substantially as described.

2. A bug-trap having the inner side of the top provided with a rough surface, which extends to a point beyond the central opening in the bottom, and a surrounding smooth surface, substantially as described.

3. In a bug-trap the combination of an upper member, a convex top having a central rough surface, a surrounding smooth surface, and a lower member, a conical bottom, a central opening therein directly underneath and within the radius of said rough surface, substantially as described.

4. In a bug-trap, the combination of an upper member, a top having its central inner surface made rough and extending to a point beyond the opening in the bottom, a surrounding smooth surface, said top having a central opening, a sleeve adapted to enter said opening, a lower member adapted to hold insect-poison, substantially as described.

In testimony whereof I affix my signature in presence of two witnesses.

PATRICK J. McATEE.

Witnesses:
THOS. McATEE,
PATRICK CANFIELD.